(12) United States Patent
Maruoka et al.

(10) Patent No.: US 10,748,298 B2
(45) Date of Patent: Aug. 18, 2020

(54) PERIPHERY MONITORING DEVICE

(71) Applicant: AISIN SEIKI KABUSHIKI KAISHA, Kariya-shi, Aichi-ken (JP)

(72) Inventors: Tetsuya Maruoka, Okazaki (JP); Kazuya Watanabe, Anjo (JP); Kinji Yamamoto, Anjo (JP); Jun Kadowaki, Kariya (JP)

(73) Assignee: AISIN SEIKI KABUSHIKI KAISHA, Kariya-shi, Aichi-ken (JP)

( * ) Notice: Subject to any disclaimer, the term of this patent is extended or adjusted under 35 U.S.C. 154(b) by 84 days.

(21) Appl. No.: 16/208,966

(22) Filed: Dec. 4, 2018

(65) Prior Publication Data

US 2019/0172218 A1 Jun. 6, 2019

(30) Foreign Application Priority Data

Dec. 6, 2017 (JP) ................................. 2017-234029

(51) Int. Cl.
*G06T 7/70* (2017.01)
*G06T 7/20* (2017.01)
*B60K 35/00* (2006.01)
*B60R 1/00* (2006.01)

(52) U.S. Cl.
CPC ................ *G06T 7/70* (2017.01); *B60K 35/00* (2013.01); *B60R 1/00* (2013.01); *G06T 7/20* (2013.01); *B60K 2370/21* (2019.05); *B60R 1/003* (2013.01); *B60R 2300/305* (2013.01); *B60R 2300/70* (2013.01); *G06T 2207/30256* (2013.01); *G06T 2207/30261* (2013.01)

(58) Field of Classification Search
CPC ... G06T 2207/30256; G06T 7/70; G06T 7/50; G06T 2207/30261; B60R 1/00; B60R 2300/808; B60R 2300/305; B60R 1/003; B60R 2300/303; B60R 2300/70; B62D 15/0295; B60K 35/00; B60K 2370/21
See application file for complete search history.

(56) References Cited

U.S. PATENT DOCUMENTS

| | | | |
|---|---|---|---|
| 6,765,607 B2 | 7/2004 | Mizusawa et al. | |
| 9,457,632 B1 * | 10/2016 | Windeler | ............... B60D 1/366 |
| 2015/0115571 A1 * | 4/2015 | Zhang | .................... H04N 7/183 |
| | | | 280/477 |
| 2016/0272024 A1 * | 9/2016 | Bochenek | ................ B60D 1/36 |
| 2016/0375831 A1 * | 12/2016 | Wang | ................. B62D 15/0295 |
| | | | 348/148 |
| 2016/0378118 A1 * | 12/2016 | Zeng | ........................ B60D 1/62 |
| | | | 701/28 |

(Continued)

FOREIGN PATENT DOCUMENTS

JP 4739569 B2 8/2011

*Primary Examiner* — Brandon J Miller
(74) *Attorney, Agent, or Firm* — Sughrue Mion, PLLC

(57) ABSTRACT

A periphery monitoring device includes: an acquisition unit configured to acquire a peripheral image captured by an imaging unit that is provided in a vehicle and captures an image of a periphery of the vehicle, and an indicator image that is capable of being superimposed on the peripheral image and serves as an operation indicator of a driver when the driver performs a driving operation of the vehicle; and an image processing unit configured to change the indicator image from a first predetermined height to a second predetermined height and display a transition of the change.

10 Claims, 10 Drawing Sheets

(56) References Cited

U.S. PATENT DOCUMENTS

2017/0151846 A1\* 6/2017 Wuergler ................. B60D 1/62
2018/0056874 A1\* 3/2018 Lu .......................... B60Q 9/005
2020/0001790 A1\* 1/2020 Ling ........................ B60R 1/00
2020/0031281 A1\* 1/2020 Watanabe ................ H04N 7/18

\* cited by examiner

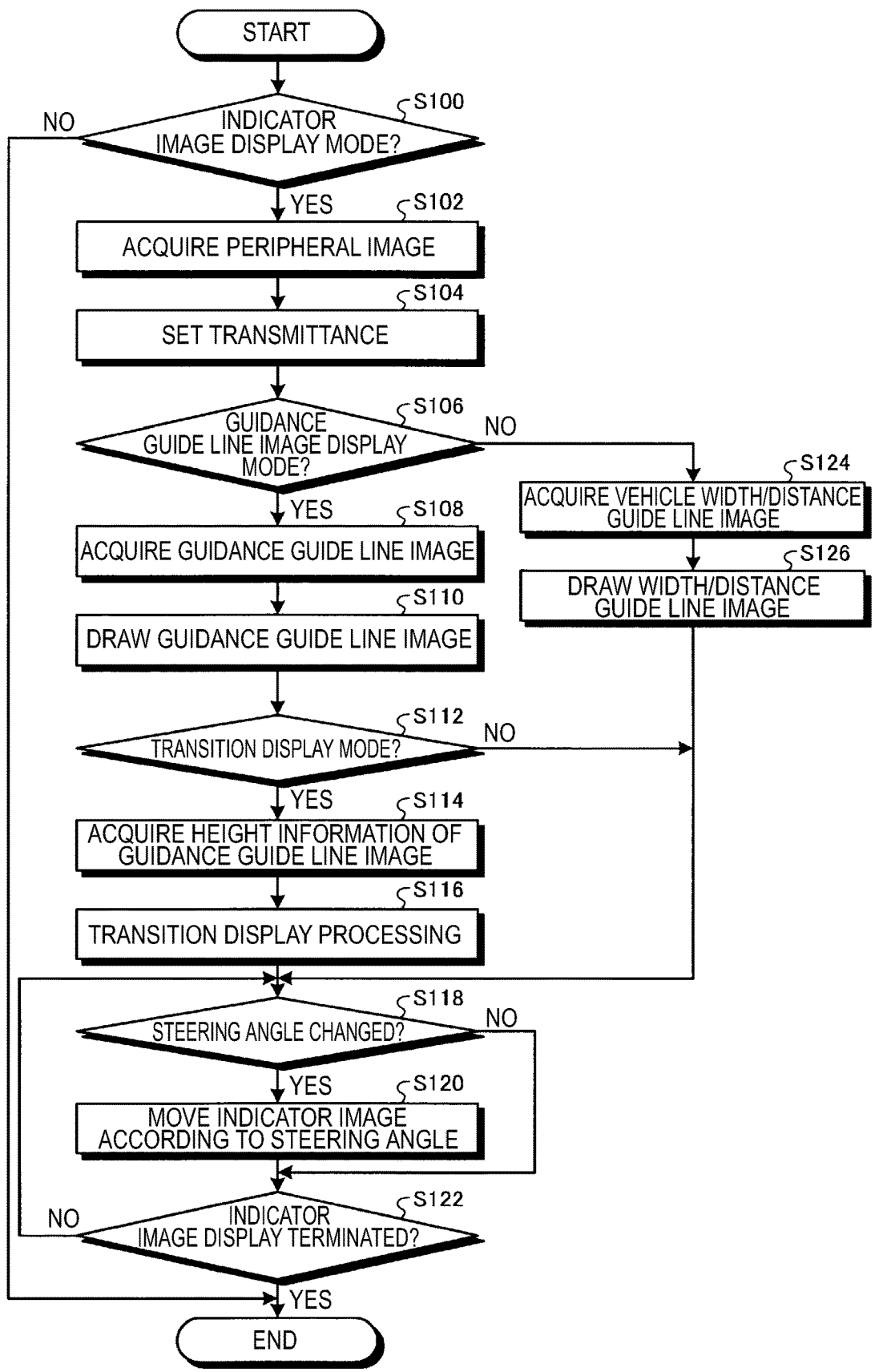

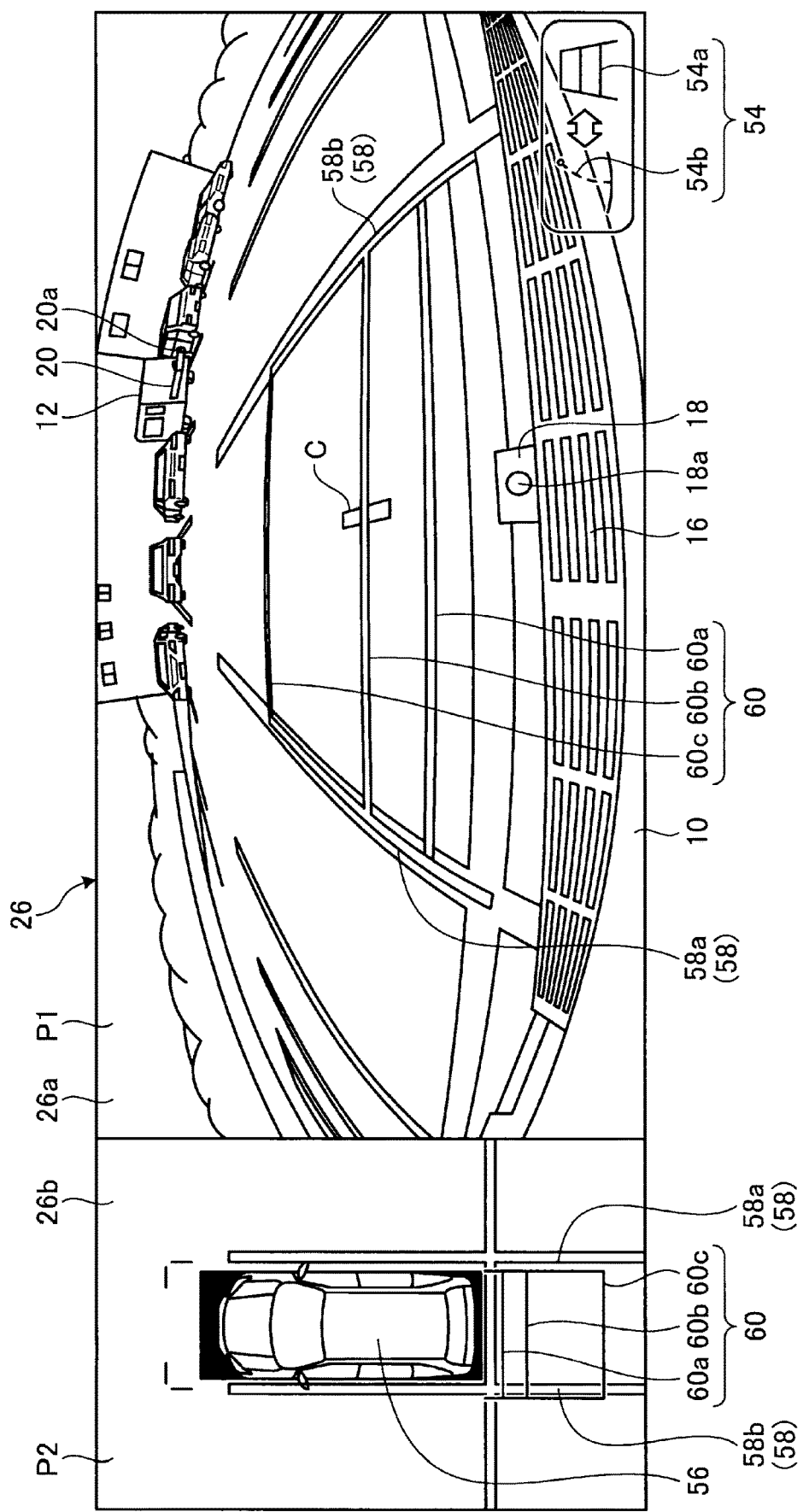

PERIPHERY MONITORING DEVICE

CROSS REFERENCE TO RELATED APPLICATIONS

This application is based on and claims priority under 35 U.S.C. § 119 to Japanese Patent Application 2017-234029, filed on Dec. 6, 2017, the entire contents of which are incorporated herein by reference.

TECHNICAL FIELD

Embodiments of this disclosure relate to a periphery monitoring device.

BACKGROUND DISCUSSION

In the related art, there has been known a periphery monitoring device which captures an image of a situation around a vehicle by an imaging unit (camera) mounted in the vehicle and displays a captured image on a display device disposed in the vicinity of a driver's seat, thereby making it easy for a driver to recognize the situation around the vehicle. Such a periphery monitoring device may display a trajectory prediction line on the screen of a display device in order to make it easy to recognize, for example, a positional relationship between an own vehicle and a surrounding object or an empty space. In addition, in a towing vehicle having a towing device, the periphery monitoring device may display a trajectory prediction line toward a towed vehicle in order to support an approaching operation to the towed vehicle during connection to the towed vehicle. In addition, in such a type of displaying a trajectory prediction line, the trajectory prediction line may be displayed at a position corresponding to the height of the towing device (hitch) which actually approaches the towed vehicle. See, for example, JP 4739569 B (Reference 1).

In the related art, the trajectory prediction line which is a graphic image different from a camera image is superimposed on a two-dimensional camera image having a depth in a state where height information is applied thereto. Therefore, it may be difficult to determine whether or not the trajectory prediction line is a line that actually has the height information only by looking at the displayed trajectory prediction line. In addition, when not recognized as the line having the height information, the superimposed line may appear to be at an unnatural position, which may damage to correct recognition or determination of a driver.

Thus, a need exists for a periphery monitoring device which is not susceptible to the drawback mentioned above.

SUMMARY

A periphery monitoring device according to an aspect of this disclosure includes: for example, an acquisition unit configured to acquire a peripheral image captured by an imaging unit that is provided in a vehicle and captures an image of a periphery of the vehicle and an indicator image that is capable of being superimposed on the peripheral image of the vehicle and serves as an operation indicator of a driver when the driver performs a driving operation of the vehicle, and an image processing unit configured to change the indicator image from a first predetermined height to a second predetermined height and display a transition of the change.

BRIEF DESCRIPTION OF THE DRAWINGS

The foregoing and additional features and characteristics of this disclosure will become more apparent from the following detailed description considered with the reference to the accompanying drawings, wherein:

FIG. 9 is a flowchart explaining an example of a processing of displaying an indicator image by the periphery monitoring device according to the embodiment; and FIG. 10 is a schematic view explaining another display example of an indicator image by the periphery monitoring device according to the embodiment.

DETAILED DESCRIPTION

Hereinafter, an exemplary embodiment disclosed here will be described. A configuration of the embodiment described below and actions, results, and effects caused by the configuration are given by way of example. The disclosure may be realized by a configuration other than the configuration disclosed in the following embodiment, and at least one of various effects based on a basic configuration and derivative effects may be obtained.

Figure 1:
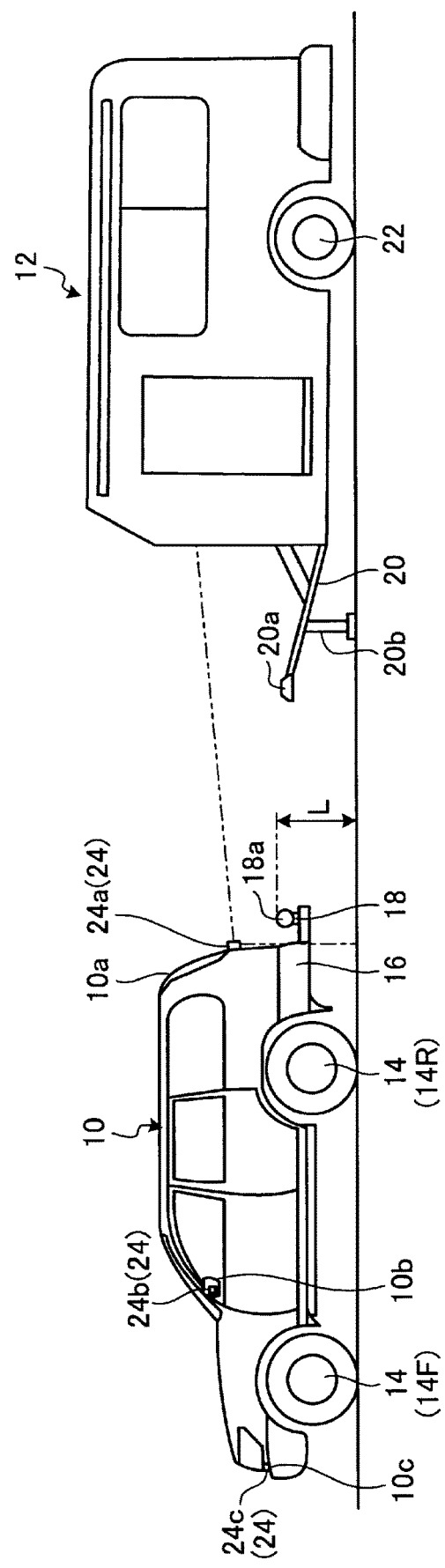
FIG. 1 is an exemplary schematic view for explaining an example in which display of an indicator image by a periphery monitoring device according to an embodiment can be applied, FIG. 1 being a side view explaining a towing vehicle as a vehicle in which the periphery monitoring device can be mounted and a towed vehicle connectable to the towing vehicle.
Figure 2:
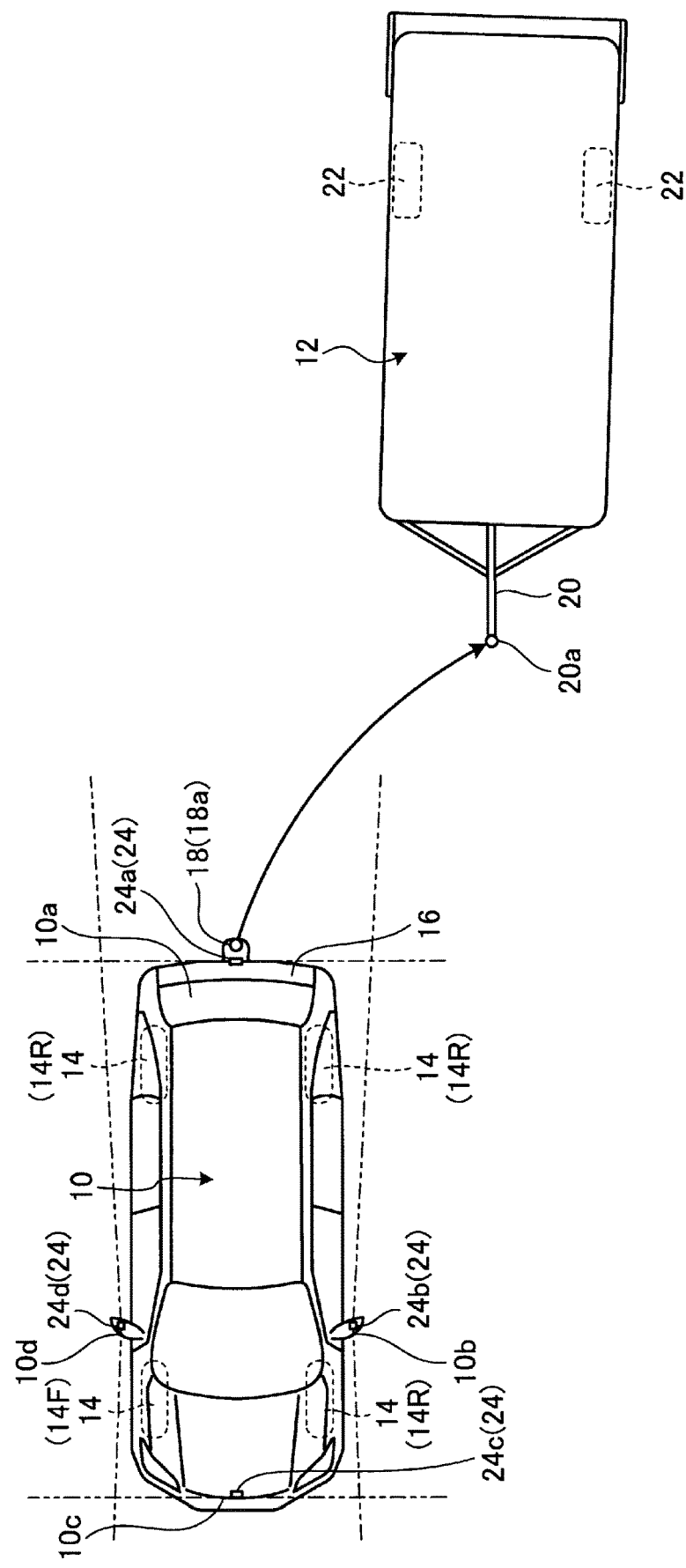
FIG. 2 is an exemplary schematic view for explaining an example in which display of the indicator image by the periphery monitoring device according to the embodiment can be applied, FIG. 2 being a plan view explaining an operation of interconnecting the towing vehicle as a vehicle in which the periphery monitoring device can be mounted and the towed vehicle connectable to the towing vehicle.
Figure 3:
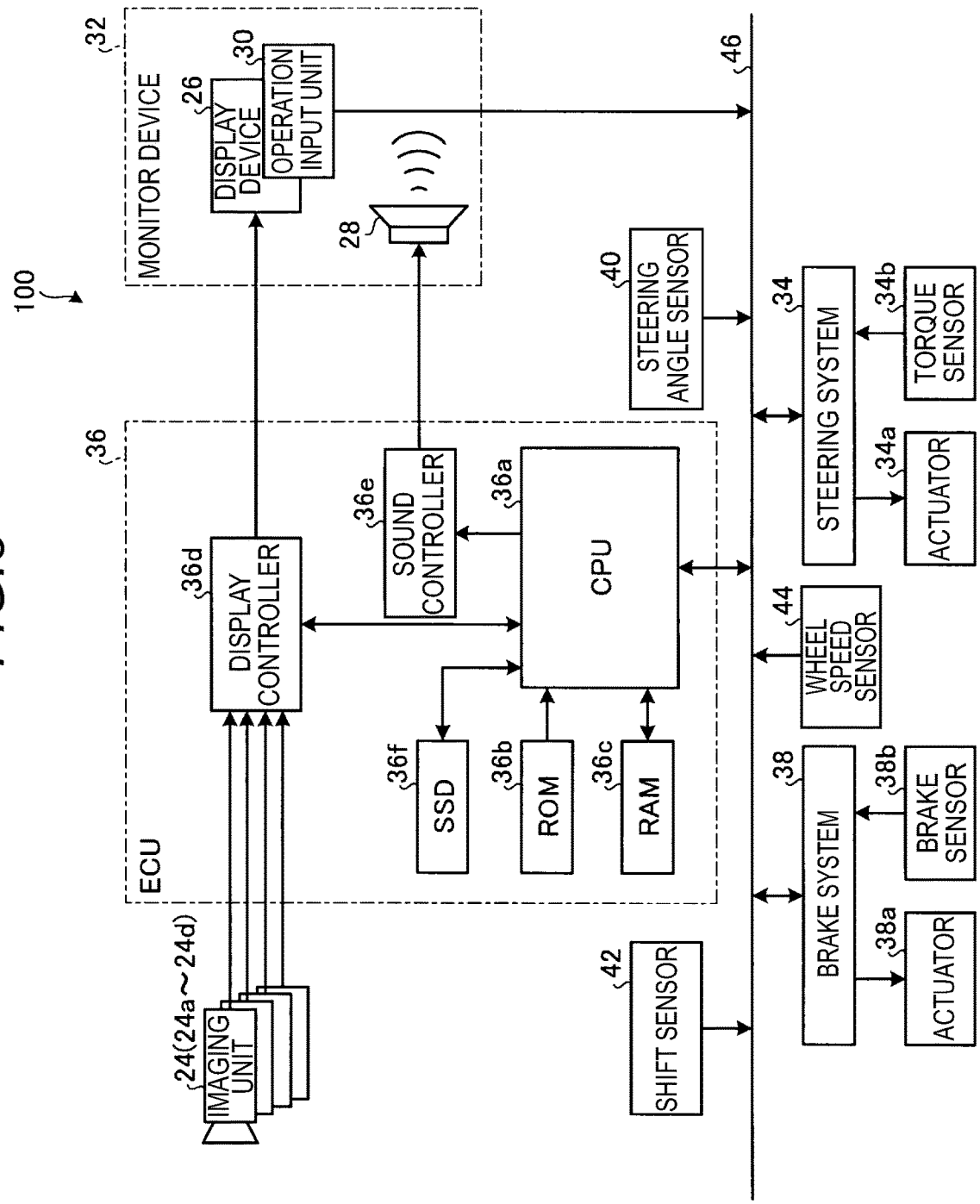
FIG. 3 is an exemplary block diagram of a configuration of a periphery monitoring system including the periphery monitoring device according to the embodiment.

A periphery monitoring device according to the present embodiment displays an indicator image so as to make it easy to recognize that the indicator image is an image having height information when superimposing the indicator image having the height information on a peripheral image captured by an imaging unit. As a vehicle in which the periphery monitoring device can be mounted, for example, a towing vehicle 10 is illustrated in FIG. 1. FIG. 1 is a side view explaining the towing vehicle 10 and a towed vehicle 12 connectable to the towing vehicle 10, and FIG. 2 is a plan view of FIG. 1. In FIG. 1, the leftward direction on the page is set to the front of the towing vehicle 10, and the rightward direction on the page is set to the rear of the towing vehicle 10. FIG. 3 is an exemplary block diagram of a configuration of a periphery monitoring system 100 including the periphery monitoring device which can be mounted in the towing vehicle 10. Thus, in the present embodiment, a case where a hitch guide line image which serves as an operation indicator of a driver who drives the towing vehicle 10 when performing a driving operation of connecting the towing vehicle 10 to the towed vehicle 12 is displayed as an example of the indicator image will be described.

First, a configuration of the towing vehicle 10 and the towed vehicle 12 will be described. The towing vehicle 10 may be, for example, an automobile having an internal combustion engine (not illustrated) as a drive source (i.e., an internal combustion engine vehicle), may be an automobile having an electric motor (not illustrated) as a drive source (e.g., an electric automobile or a fuel cell automobile), or may be an automobile having both the internal combustion engine and the electric motor as a drive source (i.e., a hybrid automobile). The towing vehicle 10 may be a sport utility vehicle (SUV) as illustrated in FIG. 1, or may be a so-called "pickup truck" in which a loading platform is provided at the rear side of the vehicle. In addition, the towing vehicle 10 may be a general passenger car. The towing vehicle 10 may be equipped with any of various transmission devices, and may be equipped with various devices (e.g., systems or parts) required to drive the internal combustion engine or the electric motor. In addition, for example, the types, the number, and the layout of devices related to the driving of wheels 14 (front wheels 14F and rear wheels 14R) in the towing vehicle 10 may be set in various ways.

A towing device 18 (hitch) protrudes from the lower portion of a rear bumper 16 of the towing vehicle 10, for example, at the center in the vehicle width direction to pull the towed vehicle 12. The towing device 18 is fixed, for example, to a frame of the towing vehicle 10. As an example, the towing device 18 includes a spherical hitch ball 18a provided at the tip end thereof which is upright in the vertical direction (vehicle vertical direction), and the hitch ball 18a is covered with a coupler 20a which is provided at the tip end of a connection member 20 fixed to the towed vehicle 12. As a result, the towing vehicle 10 and the towed vehicle 12 are connected to each other, and the towed vehicle 12 may be swung (swiveled) in the vehicle width direction with respect to the towing vehicle 10. That is, the hitch ball 18a transmits forward, backward, leftward and rightward movements to the towed vehicle 12 (the connection member 20) and also receives acceleration or deceleration power.

For example, as illustrated in FIG. 1, the towed vehicle 12 may be of a box type including at least one of a cabin space, a residential space, and a storage space, for example, or may be of a loading platform type in which a luggage (e.g., a container or a boat) is loaded. The towed vehicle 12 illustrated in FIG. 1 is a driven vehicle that includes a pair of trailer wheels 22 as driven wheels but does not include driving wheels or steered wheels. While the towed vehicle 12 illustrated in FIG. 1 is not connected to the towing vehicle 10, for example, a stand 20b which is attachable to and detachable from the connection member 20 is mounted to the towed vehicle 12, so that the towed vehicle 12 maintains balance without tilting forward.

In addition, as illustrated in FIGS. 1 and 2, the towing vehicle 10 is provided with plural imaging units 24, for example, four imaging units 24a to 24d. The imaging unit 24 is a digital camera in which an imaging element such as a charge coupled device (CCD) or a CMOS image sensor (CIS) is mounted. The imaging unit 24 may output video image data (captured image data) at a predetermined frame rate. Each imaging unit 24 includes a wide-angle lens or a fish-eye lens, and is capable of capturing an image of, for example, a range from 140° to 220° in the horizontal direction. In addition, the optical axis of the imaging unit 24 may be set to be oblique downward in some cases. Thus, the imaging unit 24 sequentially captures an image of the surrounding environment outside the towing vehicle 10 including the road surface on which the towing vehicle 10 is movable, marks (including, for example, arrows, lanes, lines indicating parking spaces, and lane-dividing lines) attached to the road surface, or objects (including obstacles such as pedestrians and vehicles).

For example, the imaging unit 24a is positioned on a wall portion below a rear hatch 10a on the rear side of the towing vehicle 10. The imaging unit 24a may capture an image of a rear area including, for example, the rear end (the rear bumper 16) of the towing vehicle 10 and the towing device 18. In addition, when the towed vehicle 12 is connected to the towing vehicle 10, the imaging unit 24a may capture an image of an area including the connection member 20 and at least the front end of the towed vehicle 12 (e.g., the range indicated by the two-dot chain line in FIG. 1) or an image of the rear area of the towed vehicle 12 which faces from the side of the vehicle 12. Captured image data obtained by the imaging unit 24a may be used to detect an object existing in the rear area of the towing vehicle 10 (e.g., a parked vehicle). In addition, as illustrated in FIGS. 1 and 2, the captured image data may be used to recognize the towed vehicle 12 and to detect a connection state (e.g., a connection angle or the presence or absence of connection) between the towing vehicle 10 and the towed vehicle 12. In this case, since the connection state or the connection angle between the towing vehicle 10 and the towed vehicle 12 may be acquired based on the captured image data obtained by the imaging unit 24a, a system configuration may be simplified and the load of a calculation processing or an image processing may be reduced.

In addition, for example, the imaging unit 24b is provided on the left end of the towing vehicle 10, for example, on a left door mirror 10b, and captures a left side image including an area centered on the left side of the towing vehicle 10 (e.g., an area from the left front side to the left rear side). For example, the imaging unit 24c is provided on the front side of the towing vehicle 10, i.e., an end portion at the front side in the vehicle longitudinal direction, for example, a front grill 10c or a front bumper, and captures a front image including the front of the towing vehicle 10. For example, the imaging unit 24d is provided on the right end of the towing vehicle 10, for example, on the right door mirror 10d, and captures a right side image including an area centered on the right side of the towing vehicle 10 (e.g., an area from the right front side to the right rear side). A calculation processing or an image processing may be executed based on the captured image data obtained by the plural imaging units 24 to generate an image with a wider viewing angle, or to generate a virtual bird's-eye view image (plane image) of the towing vehicle 10 viewed from above.

As illustrated in FIG. 3, a display device 26 and a sound output device 28 are provided in a vehicle cabin of the towing vehicle 10. The display device 26 is, for example, a liquid crystal display (LCD) or an organic electroluminescent display (OLED). The sound output device 28 is, for example, a speaker. In addition, the display device 26 is covered with a transparent operation input unit 30 such as, for example, a touch panel. An occupant (e.g., a driver) may visually perceive an image displayed on a display screen of the display device 26 through the operation input unit 30. In addition, the occupant may execute operation input by operating the operation input unit 30 via touching, pushing, or moving with a finger, for example, at a position corresponding to the image displayed on the display screen of the display device 26. The display device 26, the sound output device 28, the operation input unit 30, and the like are provided, for example, in a monitor device 32 which is positioned on the central portion in the vehicle width direction, i.e., in the transverse direction of a dashboard of the towing vehicle 10. The monitor device 32 may include an operation input unit (not illustrated) such as a switch, a dial, a joystick, or a push button. For example, the monitor device 32 may also be used as a navigation system or an audio system.

In addition, as illustrated in FIGS. 1 and 2, the towing vehicle 10 is, for example, a four-wheeled vehicle, and includes two left and right front wheels 14F and two left and right rear wheels 14R. All of the four wheels 14 may be configured to be steerable. As illustrated in FIG. 3, the towing vehicle 10 includes a steering system 34 which steers at least two wheels 14. The steering system 34 includes an actuator 34a and a torque sensor 34b. The steering system 34 is electrically controlled, for example, by an electronic controller (ECU) 36 to operate the actuator 34a. The steering system 34 is, for example, an electric power steering system or a steer-by-wire (SBW) system. The steering system 34 applies a torque, i.e., an assistance torque to a steering wheel by the actuator 34a to supplement a steering force, or steers the wheels 14 by the actuator 34a. In this case, the actuator 34a may steer a pair of wheels 14, or may steer plural wheels 14. In addition, the torque sensor 34b detects, for example, the torque that the driver applied to the steering wheel.

In addition, as illustrated in FIG. 3, in the periphery monitoring system 100 (periphery monitoring device), in addition to the ECU 36, the monitor device 32, and the steering system 34, for example, a brake system 38, a steering angle sensor 40, a shift sensor 42, and a wheel speed sensor 44 are electrically connected via an in-vehicle network 46 as an electric communication line. The in-vehicle network 46 is configured as, for example, a controller area network (CAN). The ECU 36 may control, for example, the steering system 34 or the brake system 38 by sending a control signal via the in-vehicle network 46. In addition, the ECU 36 may receive, for example, a detection result of the torque sensor 34b, the brake sensor 38b, the steering angle sensor 40, the shift sensor 42, or the wheel speed sensor 44, or an operation signal of the operation input unit 30 via the in-vehicle network 46.

The ECU 36 includes, for example, a central processing unit (CPU) 36a, a read only memory (ROM) 36b, a random access memory (RAM) 36c, a display controller 36d, a sound controller 36e, and a solid state drive (SSD) (flash memory) 36f. The CPU 36a reads a program stored (installed) in a nonvolatile storage device such as the ROM 36b, and executes a calculation processing according to the program. For example, the CPU 36a executes an image processing related to an image displayed on the display device 26. For example, the CPU 36a executes a calculation processing or an image processing on the captured image data captured by the imaging unit 24 to generate a peripheral image (e.g., a bird's-eye view image).

The RAM 36c temporarily stores various types of data used for calculation in the CPU 36a. In addition, the display controller 36d mainly executes combination of image data displayed on the display device 26 among calculation processings in the ECU 36. In addition, the sound controller 36e mainly executes a processing of sound data output from the sound output device 28 among calculation processings in the ECU 36. The SSD 36f is a rewritable nonvolatile storage unit, and may store data even when a power supply of the ECU 36 is turned off. In addition, for example, the CPU 36a, the ROM 36b, and the RAM 36c may be integrated in the same package. In addition, the ECU 36 may be configured to use another logical operation processor such as a digital signal processor (DSP) or a logic circuit, for example, instead of the CPU 36a. In addition, a hard disk drive (HDD) may be provided instead of the SSD 36f, and the SSD 36f and the HDD may be provided separately from the ECU 36.

The brake system 38 includes, for example, an anti-lock brake system (ABS) that suppresses the locking of a brake, an electronic stability control (ESC) that suppresses the side slipping of the towing vehicle 10 during cornering, an electric brake system that increases a braking force (executes brake assistance), or a brake-by-wire (BBW). The brake system 38 applies a braking force to the wheel 14 and further applies the braking force to the towing vehicle 10 via an actuator 38a. In addition, the brake system 38 may detect, for example, the lock of the brake, the idling of the wheel 14, and the sign of side slipping from the difference in rotation between the left and right wheels 14, for example, and execute various controls. The brake sensor 38b is, for example, a sensor that detects the position of a movable element of a brake pedal.

The steering angle sensor 40 is, for example, a sensor that detects the steering amount of the steering wheel. The ECU 36 acquires, for example, the steering amount of the steering wheel by the driver or the steering amount of each wheel 14 during automatic steering from the steering angle sensor 40, and executes various controls. The shift sensor 42 is, for example, a sensor that detects the position of a movable element of a shift operation unit. The wheel speed sensor 44 is a sensor that detects the amount of rotation of the wheel 14 or the number of revolutions per unit time. The wheel speed sensor 44 outputs, as a sensor value, the number of wheel speed pulses indicating the detected number of revolutions. The ECU 36 may calculate, for example, the amount of movement of the towing vehicle 10 based on a sensor value acquired from the wheel speed sensor 44, and execute various controls.

In addition, for example, the configurations, arrangement, or electrical connection form of the above-described various sensors and actuators are merely given by way of example and may be set (changed) in various ways.

The display device 26 may superimpose, for example, a hitch guide line image or a vehicle width guide line image as an example of an indicator image serving as an operation indicator of a driver on a peripheral image captured by the imaging unit 24 and display the superimposed image, when the driver performs a driving operation. Then, in the present embodiment, when displaying the indicator image, it is possible to change the indicator image from a first predetermined height to a second predetermined height and to display a transition of the change. In addition, the predetermined height (e.g., the first predetermined height or the second predetermined height) corresponds to a three-dimensional height in a real space, an image of which is captured by the imaging unit 24. As an example, the hitch guide line image may levitate to a height corresponding to the height of a reference position set in the towing vehicle 10 and a transition of the levitation may be displayed. In order to make it easy for the hitch ball 18a of the towing vehicle 10 to approach the coupler 20a of the towed vehicle 12 when interconnecting the towing vehicle 10 and the towed vehicle 12, the hitch guide line image may be, for example, a guidance guide line image displayed so as to be lengthened from the hitch ball 18a to the coupler 20a. In this case, as illustrated in FIG. 1, the hitch ball 18a is present, for example, at the position of a height L (the second predetermined height) from the road surface (the first predetermined height) on which the towing vehicle 10 is present. Thus, when superimposing the hitch guide line image on the peripheral image displayed on the display device 26, the hitch guide line image is also displayed at the position corresponding to the height L. However, when adding height information to the hitch guide line image which is a graphic image different from a two-dimensional camera image (peripheral image) having a depth and superimposing the high guide line image on the camera image, the display position is simply offset according to the height information. As a result, at first glance, it is difficult to recognize that the height information is reflected on the hitch guide line image. Thus, in the periphery monitoring device of the present embodiment, in order to make it easy to recognize that the indicator image, for example, the hitch guide line image is displayed with the height information, a transition of movement is also displayed when displaying the indicator image. This may make it easy for the driver to recognize that the indicator image (e.g., the hitch guide line image) has the height information and is displayed in a state of levitating from the road surface.

Figure 4:
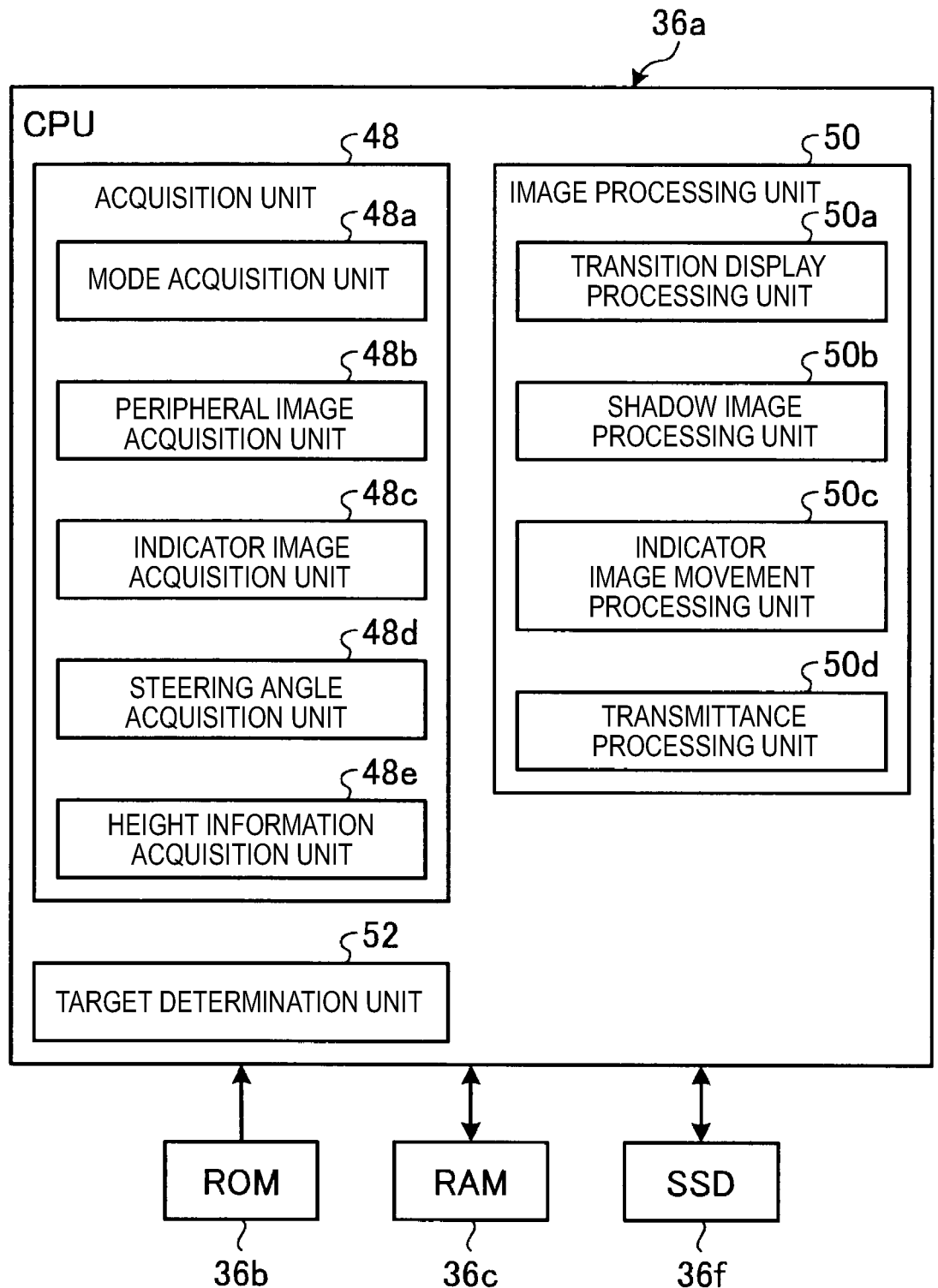
FIG. 4 is an exemplary block diagram of a configuration of a CPU of the periphery monitoring device according to the embodiment.

The CPU 36a included in the ECU 36 includes various modules for executing a processing of displaying the indicator image (e.g., the hitch guide line image) which may also display the transition of movement (e.g., levitation) as described above. The various modules are realized by the CPU 36a reading out and executing a program which is installed and stored in a storage device such as the ROM 36b. For example, as illustrated in FIG. 4, the CPU 36a includes modules such as an acquisition unit 48, an image processing unit 50, and a target determination unit 52.

The acquisition unit 48 includes, for example, a mode acquisition unit 48a, a peripheral image acquisition unit 48b, an indicator image acquisition unit 48c, a steering angle acquisition unit 48d, and a height information acquisition unit 48e, in order to acquire various pieces of information for realizing the display of the indicator image (e.g., the hitch guide line image) accompanying the transition of levitation.

For example, the mode acquisition unit 48a receives an operation signal based on an operation of the operation input unit 30, for example, when the driver performs switching between image contents (display modes) displayed on the display device 26. The display modes include, for example, a "normal display mode," an "indicator image display mode," a "standard guide line image display mode," a "guidance guide line image display mode," a "road surface mode," and a "transition display mode."

The "normal display mode" is a display mode in which, for example, a navigation screen or an audio screen which is normally displayed during driving of the towing vehicle 10 is displayed. The "indicator image display mode" is a display mode in which the indicator image (e.g., the hitch guide line image) as an operation indicator of the driver when the driver performs a driving operation is displayed so as to be superimposed on the peripheral image captured by the imaging unit 24. In addition, when the indicator image display mode is selected, for example, it is possible to select the "standard guide line image display mode" and the "guidance guide line image display mode". The "standard guide line image display mode" is a display mode in which, for example, a vehicle width guide line image which may be used to determine whether or not the towing vehicle 10 may pass through or a distance guide line image (also referred to as a distance reference line image) for making it easy to grasp the distance behind or ahead of the towing vehicle 10 during traveling of the towing vehicle 10 is displayed. In addition, the "guidance guide line image display mode" is a display mode in which a guide line image for guiding the towing vehicle 10 to a specific target position, for example, the hitch guide line image indicating the direction of movement of the hitch ball 18a or a traveling prediction line image indicating a predicted traveling direction of the entire towing vehicle 10 is displayed. In addition, for example, in the "guidance guide line image display mode," a parking frame guide line image indicating a parking space may also be displayed when parking towing vehicle 10.

The "road surface mode" is a display mode in which the indicator image is drawn so as to be in contact with the road surface on which the towing vehicle 10 exists. The "transition display mode" is a display mode in which a display position of the indicator image is changed from the first predetermined height to the second predetermined height and a transition of the change is displayed. When the indicator image is, for example, the hitch guide line image, a display position of the hitch guide line image levitates from a state of being in contact with the road surface (the first predetermined height) to a reference position (the second predetermined height) set in the towing vehicle 10 and a transition of the levitation is displayed. The "height of the reference position" set in the towing vehicle 10 is the height determined according to the indicator image to be displayed, and in a case of the hitch guide line image, may be the height L of the hitch ball 18a fixed to the towing vehicle 10 from the road surface. In addition, when the indicator image is, for example, the vehicle width guide line image, for example, the height of the reference position may be the height of the rear bumper 16 of the towing vehicle 10.

For example, when the mode acquisition unit 48a acquires the "indicator image display mode," the peripheral image acquisition unit 48b acquires image information required to display a surrounding situation of the towing vehicle 10. For example, the peripheral image acquisition unit 48b acquires data of plural captured images (e.g., data of a forward image, a left side image, a right side image, and a backward image) from the imaging units 24a to 24d which capture an image of the surrounding of the towing vehicle 10. There are a case where the acquired images are real images and are sequentially displayed on the display device 26 as they are and a case where the acquired image are subjected to viewpoint conversion, for example, and are sequentially displayed in the form of a bird's-eye view image on the display device 26.

When the mode acquisition unit 48a acquires an operation signal indicating the "indicator image display mode," the indicator image acquisition unit 48c acquires a basic shape of, for example, the "hitch guide line image," the "traveling prediction line image," the "vehicle width guide line image," the "distance guide line image," or the "parking frame guide line image" designated by the driver by reading out the basic shape from, for example, the ROM 36b. For example, the basic shape of each guide line image is displayed so as to be in contact with the road surface on which the towing vehicle 10 is present, and is a straight line parallel to the vehicle center line extending in the longitudinal direction of the towing vehicle 10 or a straight line orthogonal to the vehicle center line. For example, the "hitch guide line image" is a linear image that extends by a predetermined length, for example, a length corresponding to 2.5 m from a position on the road surface immediately under the hitch ball 18a toward the rear of the towing vehicle 10. Similarly, the "traveling prediction line image" is a linear image that extends from a center position in the vehicle width direction of the towing vehicle 10 in the heading direction of the towing vehicle 10 by, for example, a length corresponding to 2.5 m. The heading direction of the towing vehicle 10 may be determined at an operating position of the shift sensor 42. For example, the heading direction of the towing vehicle 10 is the forward direction when the shift sensor 42 is at the D-range position and is the backward direction when the shift sensor 42 is at the R-range position. The "vehicle width guide line image" is a linear image that extends by a length corresponding to 2.5 m from, for example, the vehicle end in the vehicle longitudinal direction which is parallel to the side surface of the towing vehicle 10 to which a left or right margin distance, for example, a length corresponding to 20 cm, is added to the vehicle width of the towing vehicle 10. The "distance guide line image" is a linear image that extends rearward from a position on the road surface immediately under the rear bumper 16 of the towing vehicle 10 to a position corresponding to, for example, 0.5 m, 1.0 m, or 2.5 m in a direction parallel to the rear bumper 16. Similarly, the "distance guide line image" may be displayed at a position corresponding to 0.5 m, 1.0 m, or 2.5 m from a position on the road surface immediately under a front bumper of the towing vehicle 10. The "parking space guide line image" is a linear image that defines the space corresponding to a parking space in which the towing vehicle 10 is accommodated when a parking target position is set at the time of parking of the towing vehicle 10.

The steering angle acquisition unit 48d acquires steering angle information (information about an operation state of the steering wheel) of the towing vehicle 10 output from the steering angle sensor 40. In other words, the steering angle acquisition unit 48d acquires a steering angle in a direction that the driver wishes to drive the towing vehicle 10. In addition, the steering angle acquisition unit 48d may acquire whether the towing vehicle 10 is in a forwardly moveable state or in a backwardly movable state based on the position of a movable element acquired from the shift sensor 42 and identify whether the steering angle is a steering angle in a forward movement state or a steering angle in a backward movement state.

The height information acquisition unit 48e acquires height information when moving (e.g., levitating) the indicator image from the first predetermined height to the second predetermined height from, for example, the ROM 36b. As described above, the height information is determined according to the indicator image to be displayed. For example, when displaying the hitch guide line image as the indicator image, the height information is the height L of the hitch ball 18a fixed to the towing vehicle 10 from the road surface, and when displaying the vehicle width guide line image as the indicator image, the height information is the height of the rear bumper 16 of the towing vehicle 10. The height information may be a predetermined fixed value based on the specification of the towing vehicle 10, or may be a value that is appropriately set by the driver using the operation input unit 30 or the like.

FIGS. 5 to 8 are views explaining display examples of the indicator image by the image processing unit 50 of the periphery monitoring system 100 (periphery monitoring device), and illustrate examples of displaying the hitch guide line image as an example of the indicator image that supports a connection operation of connecting the towed vehicle 12 to the towing vehicle when the towing vehicle 10 is movable backward (when the shift sensor 42 detects the R-range position). In a case of the "indicator image display mode" in which the indicator image is displayed, as illustrated in FIGS. 5 to 8, the display device 26 may be set to, for example, a dual split screen composed of a first display area 26a showing a real image P1 and a second display area 26b showing a bird's eye view image P2. As an example, the real image P1 indicates a peripheral image behind the towing vehicle 10 captured by the imaging unit 24a. In addition, the bird's-eye view image P2 is an all-around image about the position of the towing vehicle 10 that is obtained by performing an image processing such as viewpoint conversion, regarding a position immediately above the towing vehicle 10 as a virtual viewpoint, on each of the rearward image, the left side image, the forward image, and the right side image of the towing vehicle 10 captured by the imaging units 24a to 24d. In addition, when the towing vehicle 10 is movable forward, a peripheral image ahead of the towing vehicle 10 captured by the imaging unit 24c is displayed as the real image P1, and the indicator image is appropriately disposed so as to be superimposed.

In the real image P1 displayed in the first display area 26a, the rear bumper 16 of the towing vehicle 10 and the towing device 18 (hitch ball 18a) are displayed on the lower side (front side) of the screen and a situation behind the towing vehicle 10 is displayed thereabove. In addition, in the real image P1 illustrated in FIG. 5, for example, the towed vehicle 12 including the connection member 20 (the coupler 20a) which is mixed with plural parked vehicles is displayed on the screen upper side (distant side). In addition, a switching icon 54 which operates as a switch for switching between the display modes of the display device 26 is displayed on a portion (e.g., the lower right side of the screen) of the first display area 26a. In a case of FIG. 5, the switching icon 54 is a switch that is newly displayed after the "indicator image display mode" is selected, and includes a standard mode icon 54a for switching to the "standard guide line image display mode" and a guidance mode icon 54b for switching to the "guidance guide line image display mode".

In addition, in the bird's-eye view image P2 displayed in the second display area 26b, an own vehicle icon 56 indicating the towing vehicle 10 in a bird's eye view is displayed in the central area. For example, the own vehicle icon 56 may be read out from the ROM 36b and displayed. In addition, as a vehicle width guide line image 58, a right side guide line image 58a and a left side guide line image 58b are displayed behind the own vehicle icon 56. In addition, plural distance guide line images 60 are displayed so as to extend between the right side guide line image 58a and the left side guide line image 58b. The distance guide line images 60 include, for example, a first distance guide line image 60a indicating a position of 0.5 m, a second distance guide line image 60b indicating a position of 1.0 m, and a third distance guide line image 60c indicating a position of 5 m, behind the rear bumper 16 of the towing vehicle 10. In addition, the number of distance guide line images 60 is not limited to three, and may be increased or decreased according to the setting of the driver, for example, and the interval between the respective distance guide line images 60 may be appropriately set.

Figure 5:
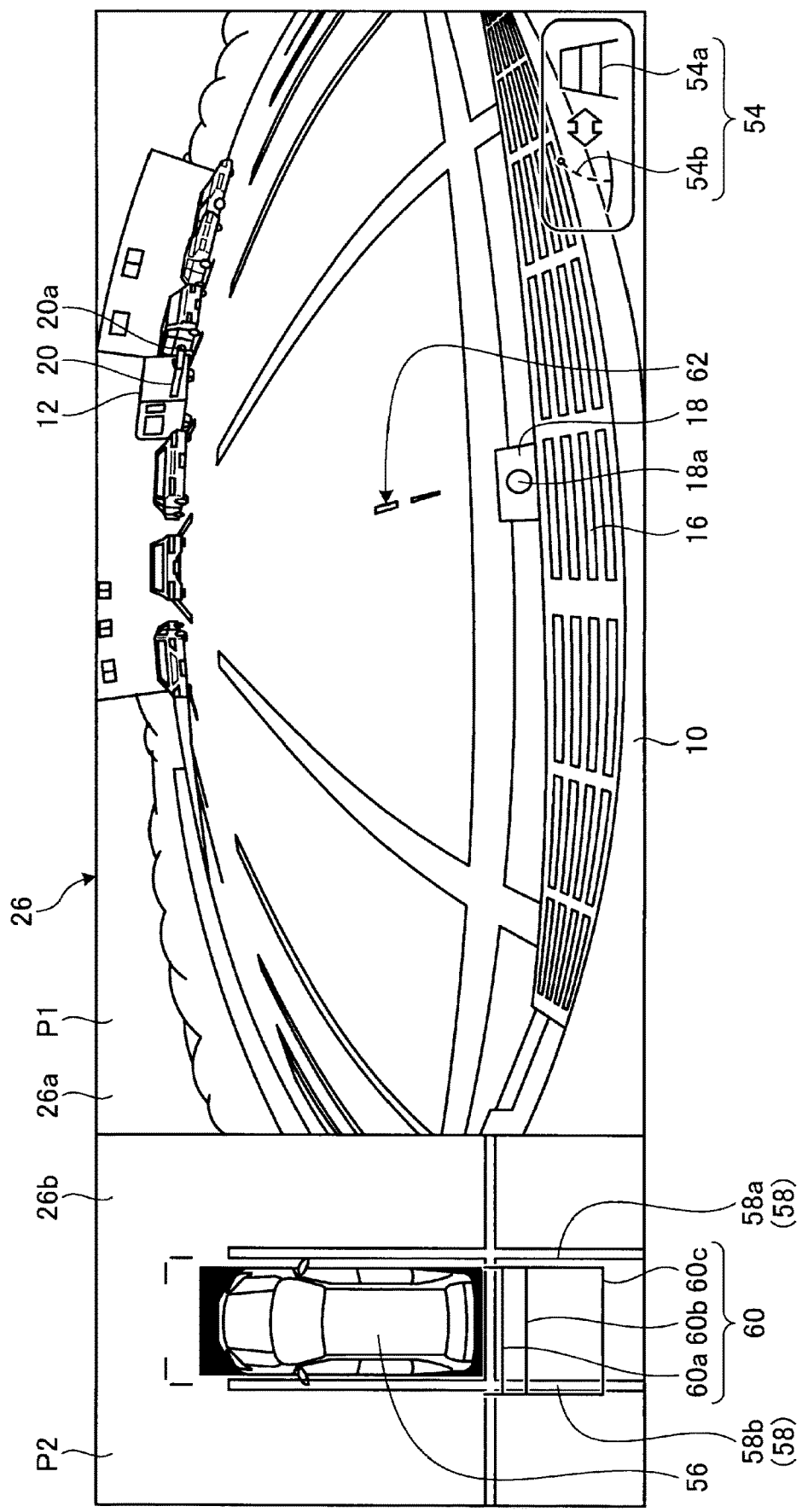
FIG. 5 is a view explaining a display example of a hitch guide line image as an indicator image by the periphery monitoring device according to the embodiment, FIG. 5 being a schematic view illustrating the time of the start of display of the hitch guide line image.
Figure 6:
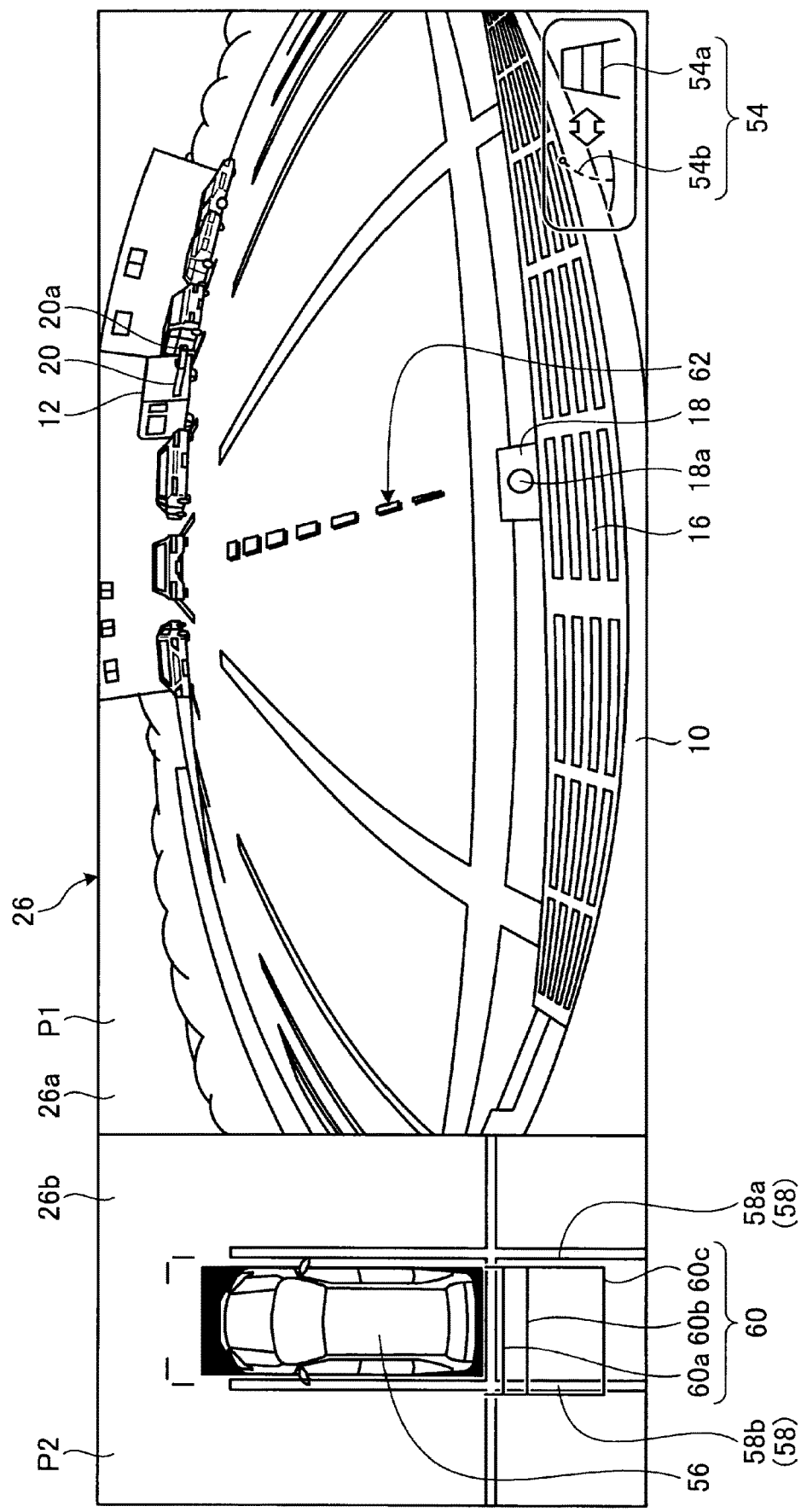
FIG. 6 is a view explaining a display example of the hitch guide line image as the indicator image by the periphery monitoring device according to the embodiment, FIG. 6 being a schematic view illustrating a transition state where the hitch guide line image is lengthened rearward.
Figure 7:
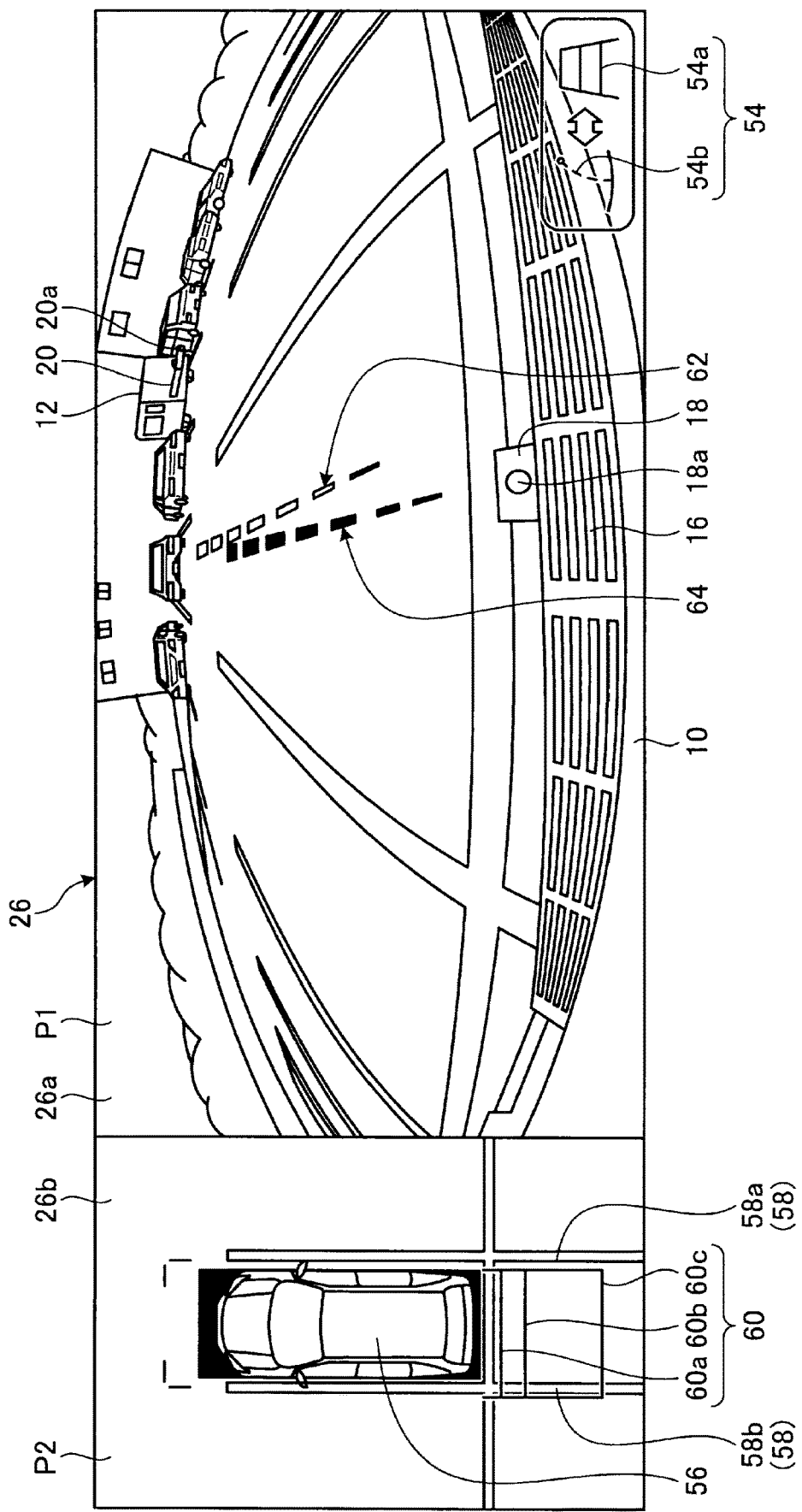
FIG. 7 is a view explaining a display example of the hitch guide line image as the indicator image by the periphery monitoring device according to the embodiment, FIG. 7 being a schematic view illustrating a transition state where the hitch guide line image levitates.
Figure 8:
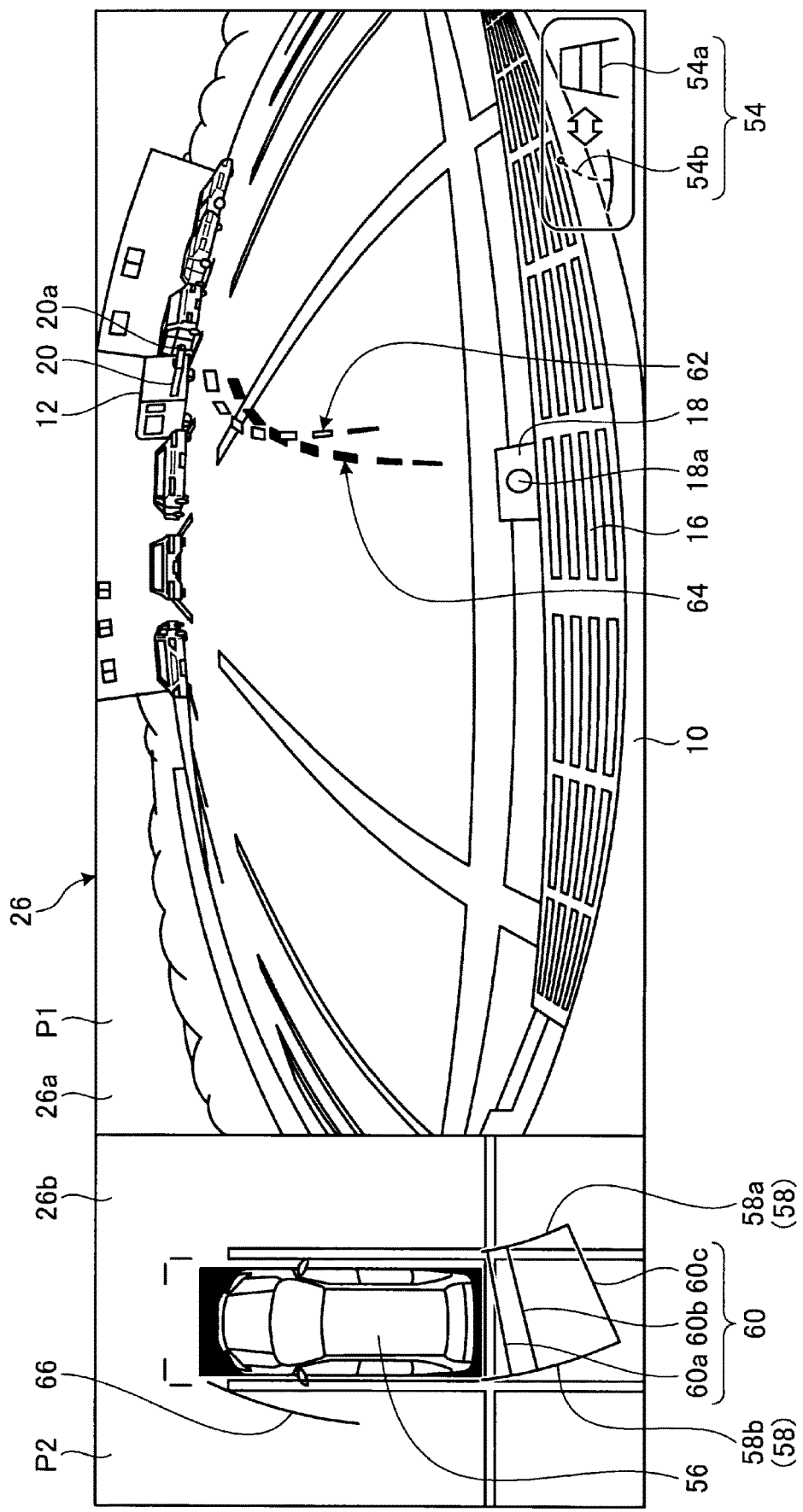
FIG. 8 is a view explaining a display example of the hitch guide line image as the indicator image by the periphery monitoring device according to the embodiment, FIG. 8 being a schematic view illustrating a transition state where the levitated hitch guide line image moves according to a steering angle of the vehicle.

In addition, in FIGS. 5 to 8, a hitch guide line image 62 is displayed as an example of the indicator image. FIG. 5 is a schematic view illustrating the time of the start of display of the hitch guide line image 62, and FIG. 6 is a schematic view illustrating a transition state where the hitch guide line image 62 extends rearward of the towing vehicle 10. In addition, FIG. 7 is a schematic view illustrating a transition state where the hitch guide line image 62 levitates, and FIG. 8 is a schematic view illustrating a transition state where the levitated hitch guide line image 62 moves according to the steering angle of the towing vehicle 10.

The image processing unit 50 includes, for example, a transition display processing unit 50a, a shadow image processing unit 50b, an indicator image movement processing unit 50c, and a transmittance processing unit 50d, in order to change the movement (e.g., levitation) of the indicator image (e.g., the hitch guide line image 62) and a display aspect after movement.

The transition display processing unit 50a executes an image processing (animation processing) of levitating the hitch guide line image 62, as illustrated in FIG. 7, by adding movement (levitation) height information acquired by the height information acquisition unit 48e to drawing data of the hitch guide line image 62 (see FIG. 6), for example, as the indicator image having a basic shape in contact with the road surface acquired by the indicator image acquisition unit 48c. The movement (levitation) speed at this time may be a predetermined fixed value that enables recognition of the presence or absence of movement, or may be a set value that is appropriately set by the driver using the operation input unit 30. By displaying, for example, a transition of the levitation of the hitch guide line image 62 as the indicator image, it may make easy for the driver to recognize that the hitch guide line image 62 (indicator image) is a drawn image having height information. In addition, when initially displaying the hitch guide line image 62 having a basic shape in contact with the road surface, as illustrated in FIGS. 5 and 6, the transition display processing unit 50a may display a transition of lengthening (animation) that is gradually lengthened to a position corresponding to 2.5 m behind the towing vehicle 10. Displaying such a transition of lengthening makes it easy to concentrate attention of the driver and to recognize that the hitch guide line image 62 (indicator image) is displayed.

As illustrated in FIG. 7, when moving (e.g., levitating) the indicator image (e.g., the hitch guide line image 62), the shadow image processing unit 50b separates a shadow image 64 (first indicator image) indicating an original state of being in contact with the road surface from the hitch guide line image 62 (second indicator image) in a moved state, and displays the two images side by side in the height direction. In addition, the height direction in this case may not necessarily be the vertical direction. Since the shadow image 64 is displayed so as to stay on the road surface unlike the levitated hitch guide line image 62, the shadow image 64 may be viewed as "shadow" of the hitch guide line image 62 which is projected on the road surface. In other words, by displaying the shadow image 64, it may make it easier to recognize that the hitch guide line image 62 is in a levitated state. In addition, the shadow image 64 may be displayed with, for example, "black," and the levitating hitch guide line image 62 may be displayed with a color that is easily distinguishable from letters and marks drawn on the road surface, for example, "green," "blue," or "yellow." In addition, the shadow image 64 may be displayed so as to overlap below the hitch guide line image 62 (indicator image) before levitation. In addition, at this time, by slightly deviating the shadow image 64 from the hitch guide line image 62 in the vehicle width direction, it may make easy for the driver to recognize the presence of the shadow image 64 before the levitation of the hitch guide line image 62.

As illustrated in FIG. 8, the indicator image movement processing unit 50c moves (deforms) the indicator image (e.g., the hitch guide line image 62) moved (e.g., levitated) in the height direction and the shadow image 64 left on the road surface in the steering direction according to steering angle information acquired by the steering angle acquisition unit 48d. That is, the hitch guide line image 62 and the shadow image 64 are oriented to a direction in which the towing vehicle 10 faces when the towing vehicle 10 is traveled. For example, as illustrated in FIG. 8, when the towed vehicle 12 to be connected is stopped behind the towing vehicle 10, it is possible to move the towing vehicle 10 toward the towed vehicle 12 by operating the steering wheel of the towing vehicle 10 so that the hitch guide line image 62 is oriented toward the towed vehicle 12. That is, it is possible to easily cause the hitch ball 18a to approach the coupler 20a.

The transmittance processing unit 50d changes a transmittance when displaying the indicator image (e.g., the hitch guide line image 62) according to a displacement (e.g., levitation) state of the indicator image. For example, as illustrated in FIGS. 5 and 6, when lengthening the hitch guide line image 62 (that is in contact with the road surface), the hitch guide line image 62 is displayed with a transmittance of "0%," so that the presence of the hitch guide line image 62 may be clearly recognized. Then, upon levitation as illustrated in FIG. 6, the transmittance of the hitch guide line image 62 is gradually increased so as to reach, for example, 50% when the hitch guide line image 62 levitates to a position corresponding to the height information acquired by the height information acquisition unit 48e. As a result, even when the hitch guide line image 62 is superimposed on any object that is originally present in the peripheral image captured by the imaging unit 24a, for example, the coupler 20a or a displayed object (e.g., lanes) on the road surface, the coupler 20a or the displayed object on the road surface may be recognized through the hitch guide line image 62 with the increased transmittance. Thus, it is easy to align, for example, the tip of the hitch guide line image 62 with the position of the coupler 20a by changing the steering angle. In addition, the transmittance processing unit 50d may also change the transmittance of the shadow image 64 in the same manner and may obtain the same effect. The transmittance may be set to a fixed value as described above, or may be set appropriately by the driver using, for example, the operation input unit 30.

In addition, in the examples of FIGS. 5 to 8, the hitch guide line image 62 or the shadow image 64 is indicated by a broken line. Through such display using the broken line, when superimposing the indicator image such as the hitch guide line image 62 or the shadow image 64 on the real image P1, a portion that overlaps, for example, the coupler 20a or a displayed object on the road surface is reduced, which improves the recognition of the coupler 20a or the displayed object. Conversely, when emphasizing the recognition of the indicator image such as the hitch guide line image 62 or the shadow image 64, the indicator image may be displayed with a solid line.

The target determination unit 52 is a module that may be added as an additional function. When displaying the indicator image such as the hitch guide line image 62, the target determination unit 52 may perform a processing of determining a movement target position on the peripheral image. For example, when displaying the hitch guide line image 62, the movement target position is a position at which the towed vehicle 12 is present. In this case, as described above, after levitating and displaying the hitch guide line image 62, the driver aligns the hitch guide line image 62 with the position of the towed vehicle 12 by operating the steering wheel. As another embodiment, when the target determination unit 52 is used, the towed vehicle 12 may be determined to a movement target position by the target determination unit 52 and the hitch guide line image 62 may be automatically drawn so as to reach that position. The movement target position may be determined, for example, by detecting the towed vehicle 12 via an image processing such as pattern matching of comparing the peripheral image acquired by the imaging unit 24*a* with a reference pattern (e.g., a shape pattern of the towed vehicle 12) previously held in the ROM 36*b* or the like. In addition, as another embodiment, the driver may determine the movement target position by clicking the towed vehicle 12 in the real image P1 on the screen using the operation input unit 30. When the target determination unit 52 is used, the actuator 34*a* of the steering system 34 may be operated according to a direction in which the hitch guide line image 62 is lengthened to the movement target position determined by the target determination unit 52, so that the steering angle is automatically adjusted. As a result, it is possible to more smoothly and easily align the hitch ball 18*a* and the coupler 20*a* with each other, and the driver may immediately start movement of the towing vehicle 10 toward the towed vehicle 12 (the coupler 20*a*) without adjusting the steering angle. In addition, in another embodiment, in addition to displaying the hitch guide line image 62 (or the shadow image 64) which is automatically lengthened to the movement target position determined by the target determination unit 52, a steering angle guide line image corresponding to the angle (steering angle) of the steering wheel of the towing vehicle 10 which is similar to the hitch guide line image 62 may be displayed, and the driver may operate the steering wheel so that the steering angle guide line image is superimposed on the hitch guide line image 62 which is automatically directed to the movement target position. In this case, since the displayed lines overlap each other, steering adjustment for superimposition is easy as compared with alignment between the hitch guide line image 62 and the towed vehicle 12 which is present at a distance, and the lines may be more accurately aligned with each other.

Details of a display processing by the periphery monitoring device (periphery monitoring system 100) configured as described above will be described below with reference to the flowchart of FIG. 9. In addition, an example illustrated in FIG. 9 illustrates a case where the hitch guide line image 62 among the guidance guide line images is levitated and displayed to display a transition of movement of the indicator image and a case where other indicator images, for example, the vehicle width guide line image and the distance guide line image are not levitated. Although the periphery monitoring system 100 may levitate plural types of indicator images, since this may make the display content of the display device 26 be complicated and make it difficult to grasp the display content, the number of indicator images to be levitated and displayed may be set to, for example, 1 which is appropriately selected by the driver.

First, the CPU 36*a* acquires a display mode requested by the display device 26 via the mode acquisition unit 48*a*. For example, when the switch for switching between the display modes of the operation input unit 30 displayed on the display device 26 is not operated, and thus the indicator image display mode is not selected (No in S100), it is determined that the driver of the towing vehicle 10 wishes the "normal display mode" in which a normal display screen, for example, a navigation screen or an audio screen is displayed. In this case, the CPU 36*a* terminates this flow without changing the display mode of the display device 26.

On the other hand, in S100, when the switch for switching between the display modes of the operation input unit 30 displayed on the display device 26 is operated and the "indicator image display mode" is selected (Yes in S100), the peripheral image acquisition unit 48*b* acquires the peripheral image of the towing vehicle 10 output from the imaging unit 24 (S102). For example, as illustrated in FIG. 5, the CPU 36*a* displays the real image P1 which uses the image captured by the imaging unit 24*a* in the first display area 26*a*, and generates the bird's-eye view image P2 using the images captured by the imaging units 24*a* to 24*d* to display the bird's-eye view image P2 in the second display area 26*b*. In this case, for example, the switching icon 54 is displayed on the lower right side of the real image P1. The switching icon 54 displayed at this time includes the standard mode icon 54*a* for switching to the "standard guide line image display mode" in which the vehicle width guide line image 58 or the distance guide line image 60 is displayed and the guidance mode icon 54*b* for switching to the "guidance guide line image display mode" in which the hitch guide line image 62 is displayed. In addition, the transmittance processing unit 50*d* performs setting of the transmittance of the indicator image to be displayed (S104). As described above, the setting of the transmittance may change according to a display aspect of the indicator image. For example, when levitating the indicator image, the indicator image is heavily displayed with a transmittance of 0% when the indicator image is in contact with the road surface, and the transmittance is gradually increased during levitation so as to reach 50% at the time of completion of the levitation, so that the road surface on which the indicator image is superimposed is visible through the indicator image. In addition, when not levitating the indicator image, that is, when displaying the indicator image in a state of being in contact with the road surface, the indicator image is lightly displayed with a transmittance of 50% from the beginning of display. In addition, the transmittance may be appropriately determined by the driver using the operation input unit 30, for example, but step S104 may be omitted when a predetermined value is used as described above.

Then, when the mode acquisition unit 48*a* acquires an operation signal of the guidance mode icon 54*b*, that is, when the "guidance guide line image display mode" is selected (Yes in S106), the indicator image acquisition unit 48*c* acquires the hitch guide line image 62 as the guidance guide line image from the ROM 36*b* (S108). In this case, for example, the acquired hitch guide line image 62 is displayed so as to be in contact with the road surface on which the towing vehicle 10 is present, and is a straight line that is parallel to the vehicle center line extending in the longitudinal direction of the towing vehicle 10.

Then, as illustrated in FIGS. 5 and 6, the transition display processing unit 50*a* draws the hitch guide line image 62 so as to be gradually lengthened toward the rear of the towing vehicle 10 starting from a position in the vicinity of the towing device 18 (S110). By displaying the hitch guide line image 62 so as to be gradually lengthened in an animation aspect, in the real image P1 on which various objects and lines (e.g., lanes) are displayed, it is possible to make the hitch guide line stick out and it is easy for the driver to concentrate attention on the hitch guide line image 62. The transition display processing unit 50*a* draws the hitch guide line image 62 up to a preset length (e.g., a length corresponding to 2.5 m behind the towing vehicle 10). In addition to drawing the hitch guide line image 62, the transition display processing unit 50*a* also displays a transition switching icon which is used to select whether or not to display transition (levitation) of the hitch guide line image 62 displayed in the real image P1 on, for example, the lower left corner of the real image P1. When the mode acquisition unit 48*a* acquires an operation signal indicating the selection of the "transition display mode" by the operation of the transition switching icon (Yes in S112), the height information acquisition unit 48*e* acquires the height information of the hitch guide line image 62 from, for example, the ROM 36*b* (S114). The height information may be the height of the hitch ball 18*a* of the towing device 18 which is input in advance based on, for example, the specification of the towing vehicle 10.

Then, as illustrated in FIG. 7, the transition display processing unit 50*a* starts a transition display processing of the hitch guide line image 62 (S116). In addition, in accordance with the transition display processing of the hitch guide line image 62 by the transition display processing unit 50*a*, the shadow image processing unit 50*b* performs a drawing processing of the shadow image 64, as illustrated in FIG. 7. That is, when the hitch guide line image 62 which extends so as to be in contact with the road surface starts levitation, the shadow image 64 is separated from the hitch guide line image 62 and is displayed so as to stay on the road surface. By displaying the shadow image 64 in this way, it is possible to more clearly display that the hitch guide line image 62 is levitating. In addition, the hitch guide line image 62 may automatically start levitation at a time when the drawing of the hitch guide line image 62 is completed. In this case, the processing of S112 may be omitted.

Subsequently, the CPU 36*a* determines whether or not the steering angle of the towing vehicle 10 has been changed via the steering angle acquisition unit 48*d* (S118). For example, as illustrated in FIG. 8, when the driver changes the steering angle by steering the steering wheel so that the hitch guide line image 62 is directed to the towed vehicle 12 parked behind the towing vehicle 10 (Yes in S118), as illustrated in FIG. 8, the indicator image movement processing unit 50*c* moves the indicator image (the hitch guide line image 62) according to the steering angle (steering angle information) acquired by the steering angle acquisition unit 48*d* (S120). In addition, when there is no change in the steering angle information acquired by the steering angle acquisition unit 48*d* (No in S118), the CPU 36*a* skips the processing of S120. In this case, the indicator image movement processing unit 50*c* maintains the current display state of the indicator image (e.g., the hitch guide line image 62) displayed in the real image P1. Thus, when the driver operates the steering wheel while checking the display state of the indicator image in the real image P1 (the state of the curved hitch guide line image 62 in FIG. 8), display is performed in a manner such that the indicator image (e.g., the hitch guide line image 62) is moved in response to the operation, or maintains the state thereof.

The CPU 36*a* confirms whether or not to terminate the repeated display of the indicator image during the display of the indicator image (S122). For example, when an operation signal for the change of the display mode is not acquired via the mode acquisition unit 48*a* and a request to terminate the display of the indicator image is not confirmed (No in S122), the CPU 36*a* returns to the processing of S118. That is, the CPU 36*a* confirms whether or not the steering angle information is changed via the steering angle acquisition unit 48*d* and continues to display the indicator image. On the other hand, when the operation signal for the change of the display mode is acquired via the mode acquisition unit 48*a* and the request to terminate the display of the indicator image is confirmed (Yes in S122), for example, when changed to the "normal display mode," the CPU 36*a* returns the display of the display device 26 to, for example, a navigation screen and terminates the flow.

In addition, in the processing of S112, when the mode acquisition unit 48*a* does not acquire the operation signal indicating the selection of the "transition display mode" by the operation of the transition switching icon (No in S112), the CPU 36*a* skips the processings of S114 and S116 and shifts to the processing of S118. That is, when the driver wishes to display the indicator image (e.g., the hitch guide line image 62) in a state of being in contact with the road surface, the CPU 36*a* moves the indicator image (the guidance guide line image) which remains in contact with the road surface based on the steering angle information acquired by the steering angle acquisition unit 48*d*.

In addition, when the "guidance guide line image display mode" is not selected in the processing of S106 (No in S106), the CPU 36*a* considers that the "standard guide line image display mode" has been selected. Then, the indicator image acquisition unit 48*c* acquires the vehicle width guide line image 58 (the right side guide line image 58*a* and the left side guide line image 58*b*) and the distance guide line image 60 (the first distance guide line image 60*a*, the second distance guide line image 60*b*, and the third distance guide line image 60*c*) of a basic shape from the ROM 36*b* (S124). Then, as illustrated in FIG. 10, the transition display processing unit 50*a* draws the acquired image in the real image P1 (S126). In addition, since the display content of the real image P1 may be complicated when the vehicle width guide line image 58 and the distance guide line image 60 are displayed in the real image P1, a center mark C indicating the center position in the vehicle width direction of the towing vehicle 10 may also be displayed to make it easy to grasp the center of the vehicle.

Even when the vehicle width guide line image 58 or the distance guide line image 60 is drawn, the CPU 36*a* also shifts to the processing of S118 and executes the processing after S118. That is, based on the steering angle information of the towing vehicle 10 acquired by the steering angle acquisition unit 48*d*, the display of the vehicle width guide line image 58 or the distance guide line image 60 is moved according to a direction in which the steering wheel is steered, in the same manner as a case where the hitch guide line image 62 is displayed.

The vehicle width guide line image 58 (the right side guide line image 58*a* and the left side guide line image 58*b*) and the distance guide line image 60 (the first distance guide line image 60*a*, the second distance guide line image 60*b*, and the third distance guide line image 60*c*) may be displayed in the bird's-eye view image P2 as illustrated in FIGS. 5 to 8 and FIG. 10 regardless of whether or not the "standard guide line image display mode" is selected. In addition, as illustrated in FIG. 8, the direction of the vehicle width guide line image 58 or the distance guide line image 60 displayed in the bird's-eye view image P2 may be changed according to the steering angle of the towing vehicle 10. In addition, when the steering angle of the towing vehicle 10 is other than a neutral angle (the angle of a straight traveling state=0°), as illustrated in FIG. 8, a corner trajectory line image 66 which indicates a movement prediction trajectory of a corner portion which is at the rear side in the heading direction of the towing vehicle 10 and is also at the outer swivel side may be displayed. As described above, by displaying, for example, the vehicle width guide line image 58, the distance guide line image 60, and the corner trajectory line image 66 in the bird's-eye view image P2, it is easy to grasp, for example, the state of the steering angle of the towing vehicle 10 and the future position of the towing vehicle 10 when traveling at the steering angle, and it is possible to reduce the burden of driving of the towing vehicle 10.

In this manner, when displaying the indicator image having height information to be displayed in the real image P1 (peripheral image), by further displaying a transition of movement (e.g., levitation), it may make it easy for the driver to recognize that the indicator image has height information and is displayed in a state of being moved (levitated) from the road surface. In addition, since the indicator image (e.g., the hitch guide line image 62) having the height information is displayed at an appropriate position, it is possible to more smoothly and more accurately cause, for example, the hitch ball 18a to approach the coupler 20a.

In addition, although the flowchart of FIG. 9 has illustrated an example in which the direction indicated by the hitch guide line image 62 is changed via steering of the steering wheel by the driver, as described above, a movement target position may be set by the target determination unit 52, and the direction indicated by the hitch guide line image 62 may be automatically determined. In this case, after acquiring the indicator image (e.g., the hitch guide line image 62) in the processing of S108, for example, a pattern matching processing may be performed on the real image P1 to extract the towed vehicle 12. Then, the hitch guide line image 62 which is directed to the towed vehicle 12 in the real image P1 is generated by the indicator image movement processing unit 50c and is drawn by the transition display processing unit 50a. In this state, the transition display processing of the hitch guide line image 62 may be executed. In this case, the ECU 36 may control the actuator 34a of the steering system 34 so that the steering angle is changed so as to correspond to the drawn hitch guide line image 62. As a result, the driver may easily and accurately execute a driving operation of causing the hitch ball 18a to approach the coupler 20a merely by operating an accelerator and a brake. In addition, the movement target position of the towed vehicle 12 (the position of the towed vehicle 12) in the real image P1 may be determined by the driver designating (e.g., clicks) a desired movement target position (e.g., the position of the towed vehicle 12) in the real image P1 using the operation input unit 30. In this case, it is not necessary to perform an image processing such as, for example, a pattern recognition processing, which may contribute to the simplification of the system or a reduction in calculation processing. In addition, when the target determination unit 52 is used, the processings of S118 and S120 in FIG. 9 may be omitted, which may simplify the processing. Conversely, when the target determination unit 52 is not used, the target determination unit 52 may be omitted from the module of the CPU 36a, which may contribute to the simplification of the system.

In addition, the above-described embodiment has described an example in which, when displaying the hitch guide line image 62 in contact with the road surface, animation display in which the hitch guide line image is gradually lengthened rearwards from a position in the vicinity of the towing device 18 is performed. In another embodiment, instead of executing the animation display, a hitch guide line image 62 having a large length corresponding to, for example, 2.5 m behind the towing vehicle 10 may be displayed. In this case, the display control of the hitch guide line image 62 is simplified, which may contribute to a reduction in the processing load of the CPU 36a. In addition, in this case, by displaying the hitch guide line image 62 in a blinking manner for a predetermined period after the hitch guide line image 62 is displayed, or by displaying the hitch guide line image 62 with an increased luminance, it is possible to improve the recognition of the hitch guide line image 62, in the same manner as a case of animation display in which the hitch guide line image 62 is lengthened.

In addition, although the flowchart illustrated in FIG. 9 has illustrated an example of performing a levitation display processing on the hitch guide line image 62, any other indicator image may be subjected to a transition display processing. For example, a traveling prediction line image (an indicator image extending in the vehicle length direction from the center position in the vehicle width direction of the towing vehicle 10) indicating a predicted traveling direction of the towing vehicle 10 may be levitated and displayed, which may make it easier to recognize the heading direction of the towing vehicle 10. In addition, in another embodiment, for example, the vehicle width guide line image 58 or the distance guide line image 60 which is an example of the indicator image may be levitated, for example, to the height of the rear bumper 16 and displayed. In this case, when moving the towing vehicle 10 backward, it is easy to determine whether or not the towing vehicle 10 comes into contact with an object having a height. In addition, the parking frame guide line image indicating a parking target position at a remote position in the real image P1 may be levitated and displayed as an example of the indicator image. By levitating and displaying the parking frame guide line image displayed at the remote position, it is possible to improve the recognition of the parking frame guide line image or the position of a parking space. In addition, by displaying a transition of levitation together when levitating and displaying, for example, the traveling prediction line image, the vehicle width guide line image 58, the distance guide line image 60, or the parking frame guide line image, it may make it easy for the driver to recognize that the indicator image to be displayed has height information and is displayed in a state where the height information is added thereto. As a result, it is possible to reduce erroneous recognition of the display content of the real image P1 displayed on the display device 26. In addition, it may make it difficult to feel a sense of incompatability from the display content.

In addition, although the above-described embodiment has described an example in which the shadow image 64 is also displayed when levitating the hatch guide line image 62, in another embodiment, display of the shadow image 64 may be omitted, or the shadow image 64 may no longer be displayed after the guide line image is levitated. In this case, it is possible to prevent the display content of the real image P1 from becoming complicated. Whether or not to omit the shadow image 64 may be selected by the driver, or the shadow image 64 may be automatically omitted according to the display content of the real image P1.

The flowchart illustrated in FIG. 9 has illustrated an example in which, when displaying the hitch guide line image 62 as the indicator image, the driver appropriately operates the switch for switching between the display modes to display the hitch guide line image. In another embodiment, for example, in a case of an assistance mode in which the towed vehicle 12 is connected to the towing vehicle 10, the display and levitation of the hitch guide line image 62 may be started when a shift operation unit is operated to a backward position, and the same effect may be obtained.

In addition, although the above-described embodiment has described an example in which, which the towing vehicle 10 is movable backwards, the indicator image (e.g., the hitch guide line image 62) accompanying a transition of levitation is displayed in the real image P1 indicating the rear side, in another embodiment, the indicator image accompanying a transition of levitation may be displayed on the real image P1 indicating the front side. In this case, the indicator image may be, for example, the vehicle width guide line image 58, the distance guide line image 60, or the traveling prediction line image.

FIGS. 5 to 8 and FIG. 10 has illustrated a case where, when displaying the indicator image, the display of the display device 26 is configured with a dual screen including the real image P1 and the bird's-eye view image P2. In this case, it is easy for the driver to determine, for example, a traveling direction using the indicator image accompanying a transition of levitation while grasping a situation around the own vehicle from the bird's-eye view image P2. As a result, it is possible to give an increased sense of security during a driving operation, especially during a driving operation for backward movement. In addition, in another embodiment, the bird's eye view image P2 may be omitted. In this case, the display area of the real image P1 may be enlarged, which may make it easy for the driver to recognize the display content using the indicator image.

The above-described embodiment has described an example in which, when the first predetermined height is set to, for example, the road surface and the second predetermined height is set to, for example, the height of the hitch ball 18a, a display position of the hitch guide line image 62 as the indicator image is moved (levitated) from the first predetermined height to the second predetermined height and a transition of the movement (levitation) is displayed. That is, a case where the first predetermined height is lower than the second predetermined height has been described. In another embodiment, the first predetermined height may be higher than the second predetermined height. In other words, the indicator image may be moved so as to descend from the first predetermined height toward the second predetermined height. For example, when the indicator image is a traveling prediction line image, the traveling prediction line image is first drawn at a height (first predetermined height) corresponding to the height of the rear bumper 16, and then descends, for example, toward the road surface (second predetermined height). In this case, since the traveling prediction line image is initially displayed at a high position, it is impossible to improve the recognizability of the driver. In addition, by displaying a transition of descent of the traveling prediction line image descending from the position on the road surface, it is easy to concentrate attention of the driver on the road surface and to grasp the state of the road surface. In addition, in this case, similarly, shadow images may be displayed as the indicator image (e.g., the traveling prediction line image or the first indicator image) at the first predetermined height and the second indicator image at the second predetermined height. That is, display is made such that the shadow image descends from the traveling prediction line image and is ultimately projected onto the road surface. This may contribute to both the clarification of the predicted traveling direction by the traveling prediction line image and an increase in attention to the road surface by the shadow image.

In addition, whether to display the indicator image so as to levitate or descend may be determined according to the traveling direction (forward traveling or backward traveling) of the vehicle (towing vehicle 10) and the type of the indicator image. For example, in a case of displaying the hitch guide line image 62, a transition of levitation of the hitch guide line image 62 may be displayed when the towing vehicle 10 approaches the towed vehicle 12, and a transition of descent of the hitch guide line image 62 may be displayed when the towing vehicle 10 moves far away from the towed vehicle 12. This further reduces the possibility of the hitch guide line image 62 being displayed at an unnatural position with respect to the towed vehicle 12 which changes in position relative to the towing vehicle 10. In addition, for example, in a case of displaying the parking frame guide line image as the indicator image, a transition of descent of the parking frame guide line image from the height of a reference position set in the vehicle (e.g., the height corresponding to the height of the rear bumper 16) may be displayed when the vehicle (towing vehicle 10) approaches a parking space, and a transition of levitation of the parking frame guide line image from the height in contact with the road surface may be displayed when the vehicle moves far away from the parking space. In this case, when the vehicle is far from the parking space, the parking frame guide line image is displayed in a state of levitating from the road surface, which may improve the recognition of the position of the parking space. On the other hand, as the vehicle approaches the parking space, the parking frame guide line image approaches the road surface, which may improve the recognition of the size of the parking space or the like.

In this manner, by switching the direction of the transition of the movement of the indicator image between levitation and descent, that is, by selecting the position of the first predetermined height and the position of the second predetermined height according to the type of the indicator image and the state at the time of display, a sense of incompatability is further reduced and it is easy for the driver to recognize that the indicator image is an image having height information. In addition, by displaying a transition of levitation or a transition of descent of, for example, the hitch guide line image, the traveling prediction line image, the vehicle width guide line image, the distance guide line image, or the parking frame guide line image as the indicator image, it may make it easier for the driver to recognize the displayed indicator image.

In addition, although the present embodiment has described a case where the indicator image is a linear image, the indicator image is not limited thereto and may be configured with a mark such as, for example, a circle or a rectangle, letters, or numbers, and the same effect may be obtained.

A program for periphery monitoring executed by the CPU 36a of the present embodiment may be a file in an installable format or an executable format, and may be provided by being recorded in a computer-readable recording medium such as, for example, a CD-ROM, a flexible disk (FD), a CD-R, or a digital versatile disk (DVD).

In addition, the periphery monitoring program may be provided by being stored in a computer connected to a network such as, for example, the Internet and downloaded via the network. In addition, the periphery monitoring program executed in the present embodiment may be configured so as to be provided or distributed via a network such as, for example, the Internet.

SUMMARY

A periphery monitoring device according to an aspect of this disclosure includes: for example, an acquisition unit configured to acquire a peripheral image captured by an imaging unit that is provided in a vehicle and captures an image of a periphery of the vehicle and an indicator image that is capable of being superimposed on the peripheral image of the vehicle and serves as an operation indicator of a driver when the driver performs a driving operation of the vehicle, and an image processing unit configured to change the indicator image from a first predetermined height to a second predetermined height and display a transition of the change. According to this configuration, for example, since the transition of the change is displayed in a process of displaying the indicator image, it is easy for the driver to recognize that the indicator image has height information and is also displayed in a state of being changed (moved) from the first predetermined height to the second predetermined height.

In the periphery monitoring device according to the aspect of this disclosure, the first predetermined height may be lower than, for example, the second predetermined height. According to this configuration, for example, since the indicator image is displayed so as to levitate, it is easy to grasp the behavior of the indicator image and it makes it easier to recognize that the indicator image has height information and is also displayed in a state of levitating (moving) from the first predetermined height to the second predetermined height.

In the periphery monitoring device according to the aspect of this disclosure, the first predetermined height may be higher than, for example, the second predetermined height. According to this configuration, for example, since the indicator image is displayed so as to descend, it is easy to grasp the behavior of the indicator image and it is easier to recognize that the indicator image has height information and is also displayed in a state of descending (moving) from the first predetermined height to the second predetermined height.

In the periphery monitoring device according to the aspect of this disclosure, the first predetermined height may be, for example, a height in contact with a road surface on which the vehicle is present. According to this configuration, for example, the indicator image is displayed so as to levitate from the road surface. As a result, it is easy to recognize the degree of levitation (movement) of the indicator image on the basis of the road surface (the magnitude of height information in the indicator image).

In the periphery monitoring device according to the aspect of this disclosure, the second predetermined height may be, for example, a height in contact with a road surface on which the vehicle is present. According to this configuration, for example, the indicator image is displayed so as to descend toward the road surface. As a result, it is easy to recognize the degree of descent (movement) of the indicator image with respect to the road surface (the magnitude of height information in the indicator image).

In the periphery monitoring device according to the embodiment disclosed here, the first predetermined height or the second predetermined height may be, for example, a height of a reference position set in the vehicle. According to this configuration, for example, a transition of the movement of the indicator image is displayed on the basis of a portion of the vehicle. As a result, it is easy to recognize the degree of the movement of the indicator image (the magnitude of height information in the indicator image).

In the periphery monitoring device according to the aspect of this disclosure, the image processing unit may, for example, change a direction indicated by the indicator image according to a current steering angle of the vehicle. According to this configuration, for example, since the indicator image is displayed in the direction the vehicle is heading, it is possible to effectively utilize the indicator image having height information when moving the vehicle.

In the periphery monitoring device according to the aspect of this disclosure, the image processing unit may, for example, display a first indicator image at the first predetermined height and a second indicator image at the second predetermined height side by side in a height direction. According to this configuration, it is easy to recognize a state of movement on the basis of one of the first indicator image and the second indicator image and it may make it easier to recognize that the indicator image has height information.

In the periphery monitoring device according to the aspect of this disclosure, the image processing unit may, for example, change a transmittance at a time of displaying the indicator image according to a displacement state of the corresponding indicator image. According to this configuration, for example, even if the indicator image is superimposed on a displayed object (e.g., a portion of another vehicle) which is originally displayed on the peripheral image when the indicator image is displayed so as to be superimpose on the peripheral image, it makes it possible to continuously recognize the displayed object. As a result, even when the indicator image is superimposed on the peripheral image, it may make it difficult to reduce the visibility of a surrounding situation.

The periphery monitoring device according to the aspect of this disclosure may further include, for example, a target determination unit configured to determine a movement target position of the vehicle on the peripheral image, and the image processing unit may determine the direction indicated by the indicator image along which the vehicle reaches the movement target position. According to this configuration, for example, since the indicator image may be displayed so as to coincide with the movement target position of the vehicle, it is possible to smoothly move the vehicle to the movement target position.

Although the embodiments and variations of the present disclosure have been described, these embodiments and variations are merely given by way of example, and are not intended to limit the scope of this disclosure. These novel embodiments may be implemented in various other modes, and various omissions, substitutions, and changes may be made without departing from the gist of the embodiments disclosed here. These embodiments and variations thereof are included in the scope or gist of this disclosure and are included in the equivalent range of this disclosure defined in the claims.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A periphery monitoring device comprising:
an acquisition unit configured to acquire a peripheral image captured by an imaging unit that is provided in a vehicle and captures an image of a periphery of the vehicle, and an indicator image that is capable of being superimposed on the peripheral image and serves as an operation indicator of a driver when the driver performs a driving operation of the vehicle; and
an image processing unit configured to change the indicator image from a first predetermined height to a second predetermined height and display a transition of the change.

2. The periphery monitoring device according to claim 1, wherein the first predetermined height is lower than the second predetermined height.

3. The periphery monitoring device according to claim 1, wherein the first predetermined height is higher than the second predetermined height.

4. The periphery monitoring device according to claim 2, wherein the first predetermined height is a height in contact with a road surface on which the vehicle is present.

5. The periphery monitoring device according to claim 3, wherein the second predetermined height is a height in contact with a road surface on which the vehicle is present.

6. The periphery monitoring device according to claim 1, wherein the first predetermined height or the second predetermined height is a height of a reference position set in the vehicle.

7. The periphery monitoring device according to claim 1, wherein the image processing unit changes a direction indicated by the indicator image according to a current steering angle of the vehicle.

8. The periphery monitoring device according to claim 1, wherein the image processing unit displays a first indicator image at the first predetermined height and a second indicator image at the second predetermined height side by side in a height direction.

9. The periphery monitoring device according to claim 1, wherein the image processing unit changes a transmittance at a time of displaying the indicator image according to a displacement state of the corresponding indicator image.

10. The periphery monitoring device according to claim 1, further comprising a target determination unit configured to determine a movement target position of the vehicle on the peripheral image,
wherein the image processing unit determines the direction indicated by the indicator image along which the vehicle reaches the movement target position.

* * * * *